(12) United States Patent
Dupper

(10) Patent No.: US 10,189,508 B2
(45) Date of Patent: Jan. 29, 2019

(54) TWO-TRACK VEHICLE

(71) Applicant: VOLKSWAGEN AKTIENGESELLSCHAFT, Wolfsburg (DE)

(72) Inventor: Denis Dupper, Gifhorn (DE)

(73) Assignee: Volkswagen Aktiengesellschaft (DE)

( * ) Notice: Subject to any disclaimer, the term of this patent is extended or adjusted under 35 U.S.C. 154(b) by 0 days.

(21) Appl. No.: 15/565,052

(22) PCT Filed: Apr. 8, 2016

(86) PCT No.: PCT/EP2016/057779
§ 371 (c)(1),
(2) Date: Oct. 6, 2017

(87) PCT Pub. No.: WO2016/177537
PCT Pub. Date: Nov. 10, 2016

(65) Prior Publication Data
US 2018/0086388 A1 Mar. 29, 2018

(30) Foreign Application Priority Data
May 5, 2015 (DE) ........................ 10 2015 208 312

(51) Int. Cl.
*B62D 27/00* (2006.01)
*B62D 25/20* (2006.01)
(Continued)

(52) U.S. Cl.
CPC ....... *B62D 25/2072* (2013.01); *B62D 25/025* (2013.01); *B60K 2001/0438* (2013.01); *B60Y 2410/114* (2013.01)

(58) Field of Classification Search
CPC .. B62D 25/2072; B62D 25/025; B62D 61/08; B62D 25/00; B60K 1/04
See application file for complete search history.

(56) References Cited

U.S. PATENT DOCUMENTS 5,036,938 A * 8/1991 Blount .................. B62D 61/08
 180/208
5,275,525 A * 1/1994 Grumblatt ................ B60K 1/04
 104/34

(Continued)

FOREIGN PATENT DOCUMENTS

DE 10149022 A1 4/2003
DE 10149023 A1 4/2003
(Continued)

OTHER PUBLICATIONS

Search Report for German Patent Application No. 10 2015 208 312.8, dated Jan. 20, 2016.
(Continued)

*Primary Examiner* — Hau V Phan
(74) *Attorney, Agent, or Firm* — Barnes & Thornburg LLP

(57) ABSTRACT

A two-track vehicle having a chassis on the lower face of which a component is arranged that is sensitive to scraping the road surface, the outer contour jutting out downward from the lower face of the chassis in the direction of the road surface by an offset variable and the component being covered by a base portion of a cover element to protect the component from scraping the road surface. At least one edge portion of the base portion of the cover element is laterally extended in a vehicle transverse direction, the edge portion forming a scraper stop that juts out downward from the cover element base portion in a direction onto the road surface by a vertical offset so that, when the lower face of the vehicle scrapes the road surface, the cover element base portion remains substantially out of contact with an interference contour on the road surface.

13 Claims, 5 Drawing Sheets

(51) Int. Cl.
*B62D 25/02* (2006.01)
*B60K 1/04* (2006.01)

(56) References Cited

U.S. PATENT DOCUMENTS

| | | | | |
|---|---|---|---|---|
| 8,835,033 B2* | 9/2014 | Choi | ............ | B29C 70/20 |
| | | | | 180/68.5 |
| 2010/0307848 A1* | 12/2010 | Hashimoto | ............ | B60K 1/04 |
| | | | | 180/68.5 |
| 2012/0018238 A1* | 1/2012 | Mizoguchi | ............ | B60K 1/04 |
| | | | | 180/68.5 |
| 2012/0055725 A1* | 3/2012 | Mizoguchi | ............ | B60K 1/04 |
| | | | | 180/68.5 |
| 2013/0153317 A1 | 6/2013 | Rawlinson et al. | | |
| 2013/0319780 A1* | 12/2013 | Nitawaki | ............ | B60K 1/04 |
| | | | | 180/68.5 |
| 2014/0008137 A1* | 1/2014 | Shiromura | ............ | B60K 1/04 |
| | | | | 180/68.5 |
| 2014/0158444 A1* | 6/2014 | Han | ............ | B60K 1/04 |
| | | | | 180/68.5 |
| 2014/0166381 A1* | 6/2014 | Ling | ............ | B60K 1/04 |
| | | | | 180/68.5 |

FOREIGN PATENT DOCUMENTS

| | | |
|---|---|---|
| DE | 69808340 T2 | 5/2003 |
| DE | 102011114800 A1 | 4/2013 |
| DE | 102012217161 A1 | 4/2013 |
| DE | 102012012897 A1 | 1/2014 |
| DE | 102013018658 A1 | 7/2014 |
| EP | 1050448 A1 | 11/2000 |
| EP | 2805877 A1 | 11/2014 |

OTHER PUBLICATIONS

Search Report for International Patent Application No. PCT/EP2016/057779, dated Oct. 5, 2016.

* cited by examiner

Section B - B

TWO-TRACK VEHICLE

PRIORITY CLAIM

This patent application is a U.S. National Phase of International Patent Application No. PCT/EP2016/057779, filed 8 Apr. 2016, which claims priority to German Patent Application No. 10 2015 208 312.8, filed 5 May 2015, the disclosures of which are incorporated herein by reference in their entireties.

SUMMARY

Illustrative embodiments relate to a two-track vehicle.

BRIEF DESCRIPTION OF THE DRAWINGS

The disclosed embodiments are described in more detail hereinafter with reference to the drawings, in which.

DETAILED DESCRIPTION

Figure 1:
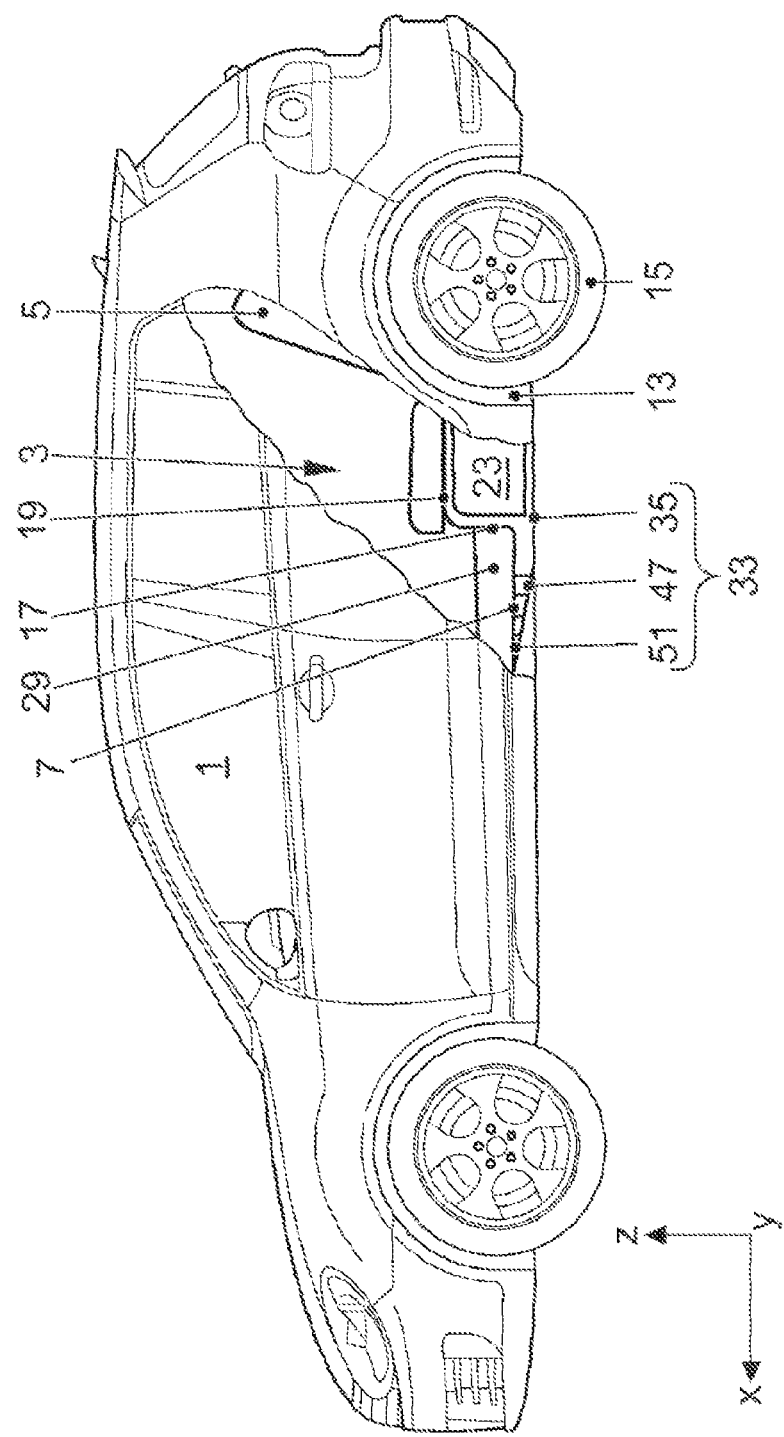
FIG. 1 shows in a side view with a partial elevation a vehicle having a hybrid drive, not shown in more detail.

In a vehicle having a purely electric drive or having a hybrid drive (in particular having a combination of a traction battery, on the one hand, and an internal combustion engine or a fuel cell, on the other hand) the traction battery may be arranged on the underbody of the vehicle as a component which is sensitive to scraping the road surface. Generally, the traction battery is constructed from battery modules. In each of these battery modules individual battery cells are combined to form a cellular composite. The positioning of the traction battery in the vehicle is designed such that in the event of a crash or when the lower face of the vehicle scrapes the road surface, damage to the battery cells in the traction battery is impeded or at least substantially prevented. Such damage could potentially lead to significant damage to the traction battery.

In a practical installed situation the traction battery may be arranged, for example, below a rear seat bench of the vehicle, as is disclosed, for example, in DE 10 2012 012 897 A1. In this case, the traction battery may be designed with an overall height in which the outer contour of the traction battery protrudes downwardly from the underbody of the body-floor assembly in the direction of the road surface by an offset and, therefore, may form the lowest point on the vehicle underbody which is at risk when the lower face of the vehicle scrapes the road surface. Such scraping of the road surface results by way of example when traveling over a curbstone, where the curbstone forms an interference contour, the vehicle underbody being able to strike thereagainst in the event of a corresponding pitching movement of the vehicle. To protect the lower face of the vehicle from scraping the road surface, the traction battery may be covered by a cover element.

With regard to protecting the traction battery mounted on the floor side from scraping the road surface and/or from crash events, generally a plurality of underride guard elements are provided on the vehicle underbody (for example, underbody cladding and/or a safety bar made of steel or titanium) which as a whole contribute to a high vehicle weight.

Generally, cladding for an underbody is disclosed in DE 101 49 023 A1, the cladding comprising at least one plate-shaped element and different functions and contours being integrated therein.

In this connection, EP 1 050 448 B1, DE 10 2013 018 658 A1, DE 101 49 022 A1 and DE 10 2012 217 161 A1 are known as further prior art.

Disclosed embodiments provide a two-track vehicle with a component, for example, a traction battery, which is sensitive to scraping the road surface, which is mounted on the underbody and which is protected from scraping the road surface in a manner which is simple and reduces the number of components.

For example, a base portion of a cover element, which covers the component which is sensitive to scraping the road surface, is extended in the vehicle transverse direction by at least one lateral edge portion which protrudes by a predetermined lateral offset over the component which is sensitive to scraping the road surface. The edge portion in this case is configured as a scraper stop which protrudes downwardly from the base portion of the cover element in the direction of the road surface with a vertical offset. The scraper stop may have a stop surface of large surface area and forms the lowest point on the vehicle undercarriage. When the lower face of the vehicle scrapes the road surface, the scraper stop of the cover element strikes against the interference contour on the road surface side, whilst the base portion of the cover element with the component which is sensitive to scraping the road surface arranged therebehind (for example, a traction battery) remains out of contact with the interference contour on the road surface side. As a result, a load path is provided by the scraper stop positioned on the edge in which the impact energy which is introduced by the interference contour on the road surface side is conducted past the component which is sensitive to scraping the road surface.

In a disclosed technical embodiment, the body-floor assembly may comprise a floor plate part which extends in the vehicle transverse direction between the lateral door sills. In the vehicle longitudinal direction to the rear, the floor plate part may transition in a stepped manner at a heel plate part, which is positioned vertically, into a rear plate part. The rear seats of the vehicle (for example, a rear seat bench) are mounted on the rear plate part. The stepped transition into the rear plate part results in a constructional space on the underbody for the component which is sensitive to scraping the road surface.

Hereinafter, further features are disclosed specifically with reference to a vehicle having a purely electric drive or having a partial electric drive (i.e., a hybrid drive) in which the component which is sensitive to scraping the road surface is a traction battery. However, it is understood that the disclosure is not in any way limited solely to the design of the component which is sensitive to scraping the road surface as a traction battery.

Thus, each door sill of the body-floor assembly in the vehicle longitudinal direction may terminate at the rear at a front plate part which is a component of a rear wheel housing. The front plate part of the wheel housing, the door sills and the floor plate part converge at a common internal corner. The internal corner region configured therebetween, when the vehicle rear wheels travel over a curbstone, is at risk of scraping the road surface which results from a pitching movement of the rear vehicle section. In this regard, the scraper stop of the cover element may be arranged in the internal corner region between the door sill and the front plate part to protect the traction battery specifically when the lower face of the vehicle scrapes the road surface, when the vehicle rear wheels travel over a curbstone and when the rear side of the vehicle may strike against the curbstone edge by performing a pitching movement.

In a further disclosed embodiment, the cover element base portion which is positioned in the vehicle vertical direction in alignment below the traction battery may be provided with further additional functions. For example, in the vehicle longitudinal direction the cover element base portion may be extended to the front by a ramp which runs in a wedge-shaped manner to the front in the vehicle longitudinal direction, as far as a front transverse edge in the direction of the vehicle lower face. In this manner it is prevented that an interference contour on the road surface side strikes in a blunt manner against the outer contour of the traction battery protruding from the lower face of the body-floor assembly. In the same manner, viewed in the vehicle longitudinal direction, the cover element base portion may be extended to the rear by a ramp. This ramp may run in a wedge-shaped manner to the rear in the vehicle longitudinal direction as far as a rear transverse edge in the direction of the vehicle lower face.

The lateral scraper stop and/or the ramp on the front side and/or rear side may be connected in the same material and/or integrally to the base portion of the cover element, forming a pre-fabricated unit with regard to reducing the number of components. With regard to reducing the component weight, this pre-fabricated unit may be produced as a fiber-composite plastics component in which reinforcing fibers are embedded in a plastics matrix. For further reduction of the component weight and for increasing the stiffness of the cover element, the cover element may have, on its upper face remote from the road surface, a frame-like reinforcing structure with transverse and longitudinal struts. Accordingly, the upper face facing the road surface may be configured to be at least substantially smooth-surfaced.

For further reduction of the material outlay and/or the component weight, the cover element geometry may be further adapted: thus the ramp, viewed in the vehicle transverse direction, may extend substantially only over the width of the traction battery, whilst further toward the vehicle exterior the ramp is dispensed with. In this regard, the scraper stop on the vehicle exterior, viewed in the vehicle longitudinal direction, may be arranged offset by a longitudinal offset to the rear of the front transverse edge of the ramp. Additionally, relative to a longitudinal edge of the scraper stop on the vehicle exterior, the ramp may be offset by a lateral offset toward the vehicle interior, namely forming a recessed external corner region in the cover element.

As mentioned above, the vehicle may have a hybrid drive and namely having an electric machine and an internal combustion engine or a fuel cell. The exhaust gas system of the internal combustion engine may be guided in the direction of the vehicle rear from the front section of the vehicle through a central tunnel extending along a vehicle central longitudinal axis. The central tunnel is integrated in the body-floor assembly. In such a case, the central tunnel extends as far as the aforementioned heel plate part which is positioned vertically in the rear region of the vehicle. Further toward the rear, the central tunnel may then transition into a longitudinal channel of the traction battery in which the exhaust gas system extends as far as the vehicle rear.

In this embodiment of the vehicle having a hybrid drive, the cover element may be divided into two segments separated from one another. These segments are configured mirror-symmetrically relative to the vehicle central longitudinal axis and are spaced apart from one another via a longitudinal free space. This free space is positioned in alignment with the aforementioned traction battery longitudinal channel to ensure a sufficient dissipation of heat from the exhaust gas system of the internal combustion engine.

The disclosed embodiments described above and/or reproduced in the dependent claims, apart from, for example, in the cases of clear dependencies or alternatives which may not be combined together, may be used individually or even in any combination with one another.

In FIG. 1, a two-track vehicle is shown in a side view. The vehicle has an interior 1 with a front region and a rear region 3 with an indicated rear seat bench 5. The rear seat bench 5 is supported on a body-floor assembly which is partially visible in outline in FIG. 1. The body-floor assembly is only shown in FIG. 1 to the extent which is required for understanding the disclosure. Accordingly, FIG. 1 and the further FIGS. 2 to 6 only show schematic simplified views which do not represent a realistic structure of the body-floor assembly of the vehicle.

Figure 2:
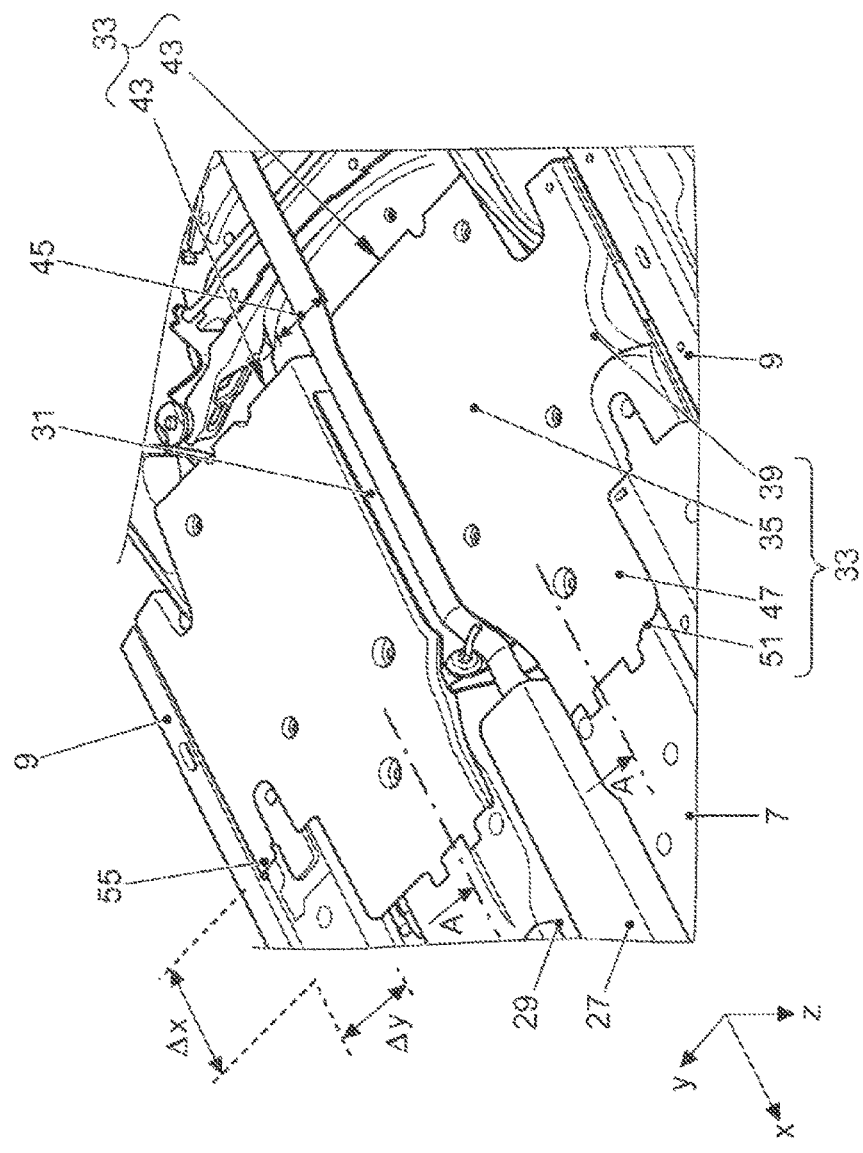
FIG. 2 shows a partial perspective view from below of a cover element for covering a traction battery.

In FIG. 1 the body-floor assembly comprises a floor plate part 7 which in FIG. 2 extends in the vehicle transverse direction y between lateral door sills 9. Each of the lateral door sills 9 in the vehicle longitudinal direction x terminates at the rear at a front plate part 11 (FIG. 6) positioned vertically. The front plate part 11 is a component of a rear wheel housing 13 in which the vehicle rear wheel 15 travels. The front plate part 11 of the wheel housing 13, the door sills 9 and the floor plate part 7 converge at a common internal corner. The internal corner region 41 which is configured therebetween (FIG. 6) is at risk of scraping the road surface when the vehicle rear wheels 15 travel over a curbstone, which results from a pitching movement of the rear vehicle section.

Figure 3:
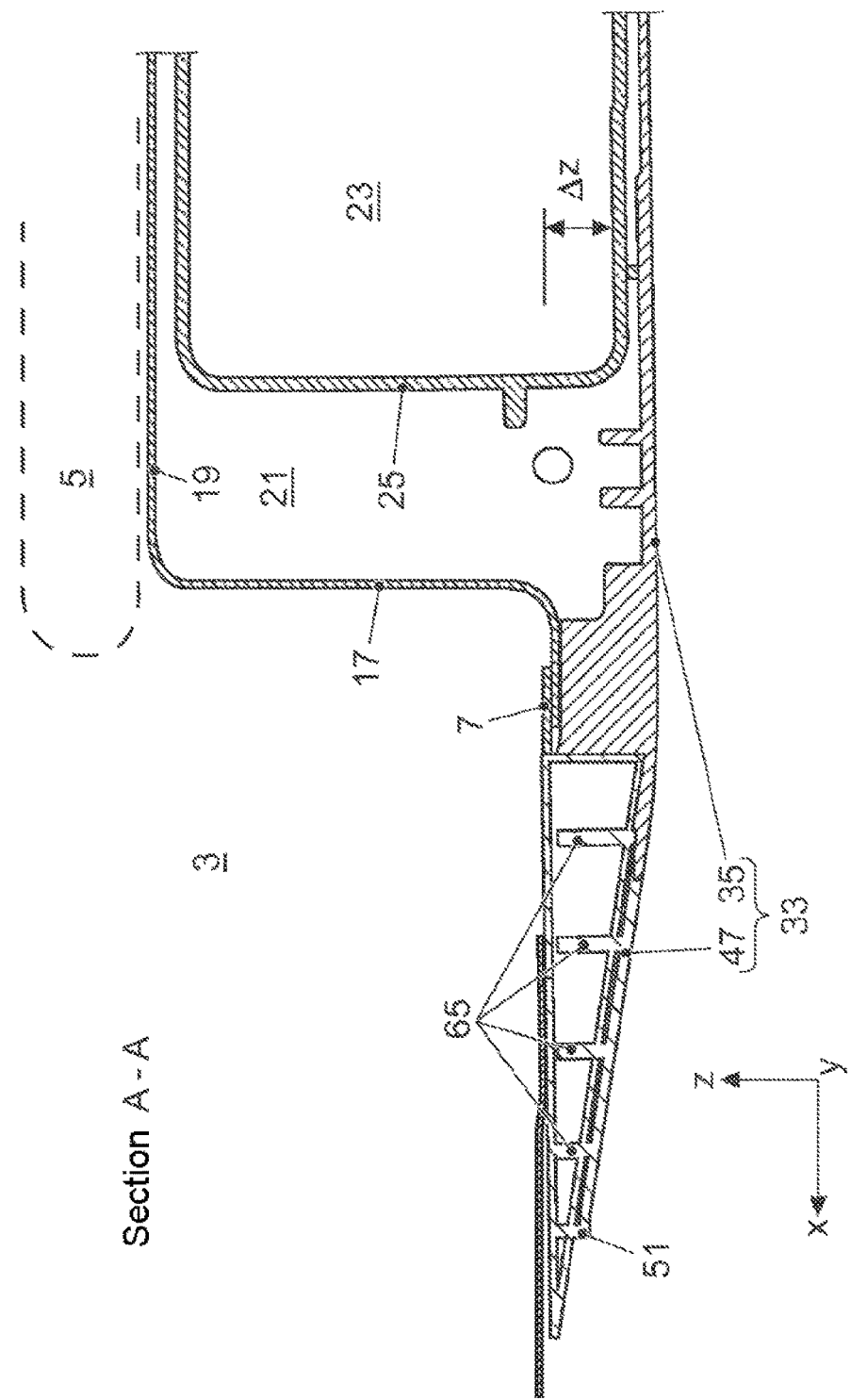
FIG. 3 shows an enlarged partial sectional view along the cutting plane A-A of FIG. 2.
Figure 4:
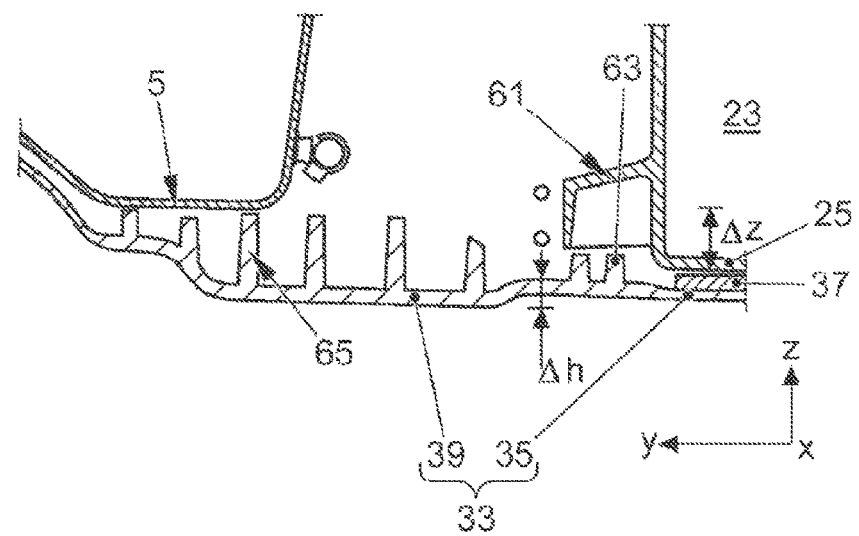
FIG. 4 shows a sectional view along the cutting plane B-B of FIG. 2.
Figure 5:
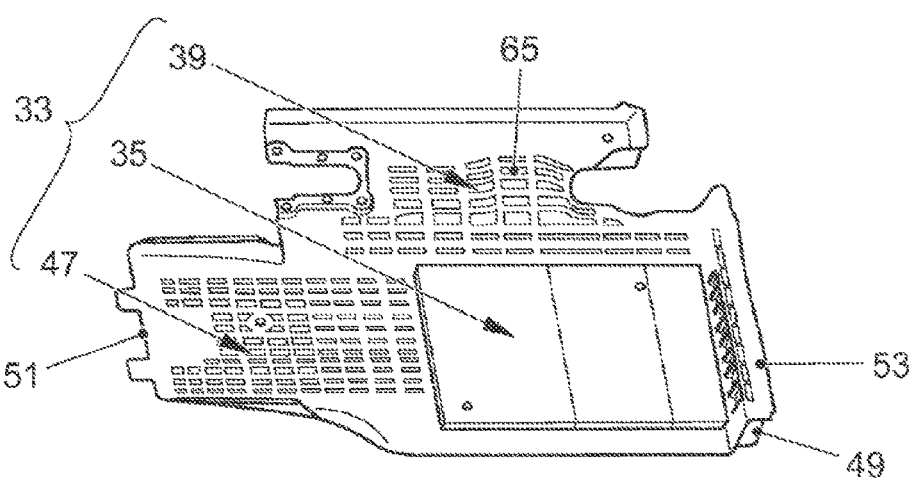
FIG. 5 shows a segment of the cover element in a perspective view and individually.

According to FIG. 1 or FIG. 3, the floor plate part 7 in the vehicle longitudinal direction x to the rear, at a heel plate part 17 positioned vertically, transitions in a stepped manner into an upper horizontal rear plate part 19. The rear seat bench 5 is mounted on the rear plate part 19. The stepped transition to the rear plate part 19 results, on the vehicle lower face, in a downwardly open constructional space 21 for a traction battery 23 of an electric drive, not shown, of the vehicle. The traction battery 23 has a battery housing 25 combined from a lower shell and an upper shell. The outer contour of the battery housing on the floor side, in FIG. 3, is not set back upwardly relative to the floor plate part 7 but instead protrudes downwardly over the lower face of the body-floor assembly by an offset $\Delta z$ in the direction of the road surface (FIG. 3 or 4).

The hybrid drive of the vehicle additionally comprises an internal combustion engine, not shown, in the front vehicle section, the exhaust gas system 27 thereof being guided in a central tunnel 29 extending in a vehicle central longitudinal axis, in the direction of the vehicle rear side. The central tunnel 29 extends as far as the heel plate part 17 positioned vertically and at that point leads into the constructional space 21 for the traction battery 23. In the extension of the central tunnel 29, the traction battery 23 has a longitudinal channel 31 through which the exhaust gas system 27 of the internal combustion engine is guided as far as the vehicle rear and namely by the interposition of a heat shield, not shown, between the exhaust gas system 27 and the traction battery 23.

For protecting the lower face of the vehicle from scraping the road surface during the operation of the vehicle, the downwardly protruding outer contour of the traction battery 23 is covered by a cover element 33. The cover element 33 is by way of example a fiber-composite plastics component. The large-surfaced base portion 35 thereof, viewed in the vertical direction z, is positioned in alignment below the traction battery 23 and namely by interposing a foam element 37 (FIG. 4) which by deformation is able to dissipate the impact energy when the lower face of the vehicle scrapes the road surface.

The cover element base portion 35 in the vehicle transverse direction y is laterally extended toward the vehicle exterior with a scraper stop 39 of large surface area. The scraper stop 39 protrudes downwardly in FIG. 4 by a vertical offset Δh of the flat-surfaced cover element base portion 33 in the direction of the road surface. When the lower face of the vehicle scrapes the road surface, therefore, an interference contour on the road surface side does not strike directly against the cover element base portion 35 but instead strikes against the laterally offset scraper stop 39, forming a load path. The cover element base portion 33, therefore, remains out of contact with the interference contour on the road surface side.

Figure 6:
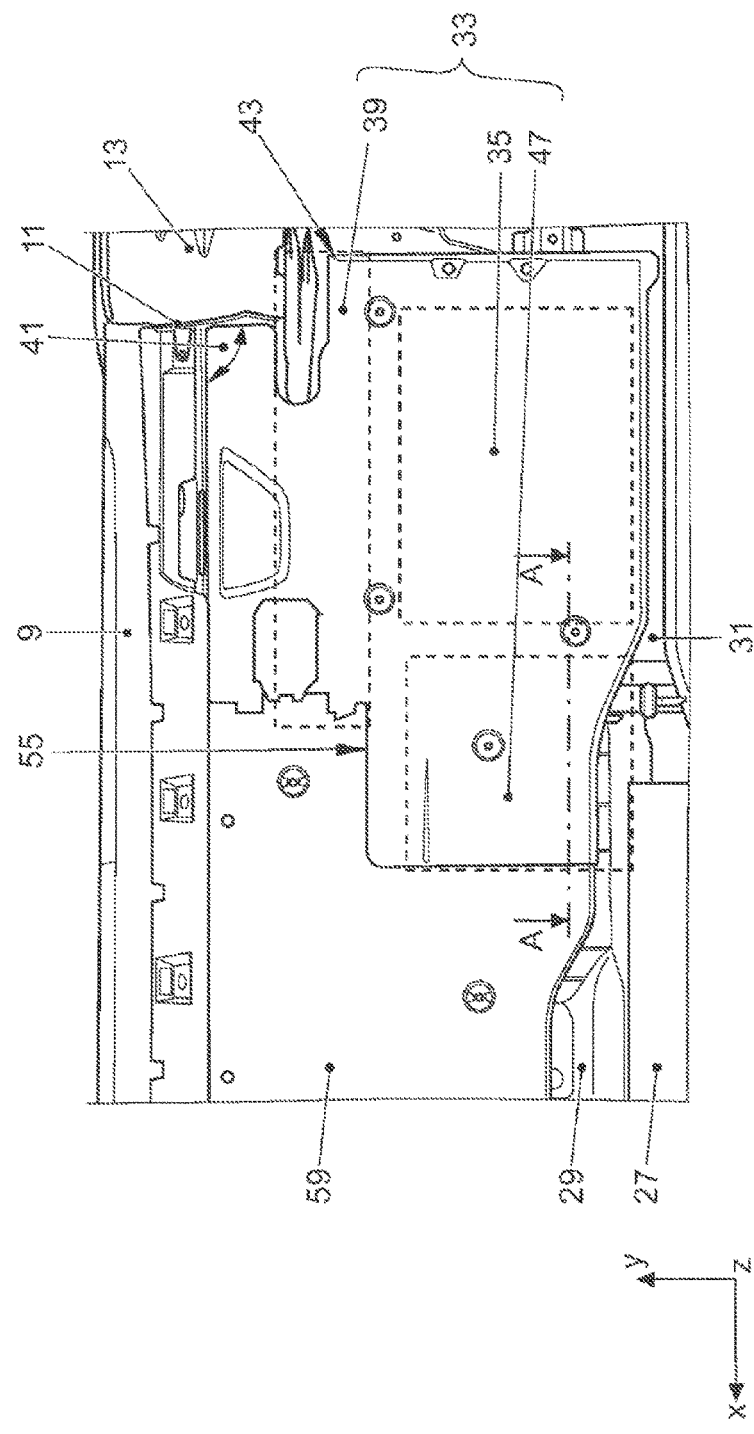
FIG. 6 shows a further partial view from below of the vehicle lower face.

As revealed from FIG. 6, the scraper stop 39 of the cover element 33 is guided laterally toward the vehicle exterior as far as the internal corner region 41 which is spanned between the door sill 9 and the front plate part 11 of the rear wheel housing 13 which is positioned vertically. In this manner, when the lower face of the vehicle scrapes the road surface, which results from a pitching movement when the rear wheels 15 travel over a curbstone, the impact energy may be introduced into the body-floor structure without damaging the traction battery 23.

As is further revealed from the figures, the cover element 33 is divided into two separate segments 43 which are designed mirror-symmetrically relative to the vehicle central longitudinal axis. The two segments 43 are spaced apart from one another via a longitudinal free space 45. This free space in turn is positioned in alignment with the battery longitudinal channel 31 to ensure a dissipation of heat from the exhaust gas system 27 during operation of the vehicle.

Additionally, the cover element base portion 35 is extended to the front and to the rear in each case by a ramp 47, 49 in the vehicle longitudinal direction x. The two ramps 47, 49 in each case run in the vehicle longitudinal direction x to the front and/or rear in a wedge-shaped manner in the direction of the vehicle lower face and namely in each case as far as a front transverse edge 51 and/or a rear transverse edge 53 and with different wedge angles.

According to FIG. 2 or 6, in each case a corner recess is formed on the front external corner regions 55 of the two cover element segments 43 to reduce the material outlay when producing the two cover element segments 43. In other words, when viewed in the vehicle longitudinal direction x, the scraper stop 39 is arranged by a longitudinal offset Δx to the rear of the front transverse edge 51 of the front ramp 47. Additionally, the front ramp 47 is offset toward the vehicle interior, relative to a longitudinal edge 57 of the scraper stop 39 on the vehicle exterior, by a transverse offset Δy to form the aforementioned external corners 55 with the material recess.

According to FIG. 6, the two cover element segments 43 are extended to the front in the vehicle longitudinal direction x by a conventional underbody cladding 59. To this end, corresponding terminal contours are provided both on the underbody cladding 59 and on the cover element segments 43 to ensure a transition which is flush with the surface.

The invention claimed is:

1. A two-track vehicle comprising:
a body-floor assembly;
a component sensitive to scraping a road surface arranged on a lower face of the body-floor assembly, wherein an outer contour of the component protrudes downwardly from the lower face of the body-floor assembly in the direction of the road surface by an offset distance,
wherein the component is covered by a base portion of a cover element on a floor side of the component to protect the component from scraping the road surface,
wherein the base portion of the cover element is laterally extended in a vehicle transverse direction by at least one edge portion which forms a scraper stop,
wherein the scraper stop protrudes downwardly from the cover element base portion in the direction of the road surface by a vertical offset distance such that, when the lower face of the vehicle scrapes the road surface, the cover element base portion remains substantially out of contact with an interference contour on the road surface side.

2. The two-track vehicle of claim 1, wherein the body-floor assembly comprises a floor plate part which extends in the vehicle transverse direction between lateral door sills of the vehicle and, in the vehicle longitudinal direction to the rear, transitions as at least one step at a heel plate part into a rear plate part which bears rear seats of the vehicle and forming a constructional space for the component on the lower face.

3. The two-track vehicle of claim 2, wherein each of the lateral door sills of the body-floor assembly terminates in the vehicle longitudinal direction at the rear at a front plate part which is a component of a rear wheel housing, and an internal corner region is spanned between a lateral door sill, of the lateral door sills, and the front plate part, the scraper stop of the cover element is arranged in said internal corner region.

4. The two-track vehicle of claim 1, wherein the scraper stop and the base portion of the cover element are configured in the same material and/or integrally.

5. The two-track vehicle of claim 1, wherein the component which is sensitive to scraping the road surface is a traction battery of an electric drive of the vehicle.

6. The two-track vehicle of claim 5, wherein the battery housing of the traction battery has at least one reinforcing web protruding laterally outwardly, and in that the cover element on its upper face remote from the road surface has a supporting contour which, at least when the lower face of the vehicle scrapes the road surface, comes to bear against the reinforcing web of the battery housing, forming a load path.

7. The two-track vehicle of claim 5, wherein the body-floor assembly comprises a central tunnel extending along a vehicle central longitudinal axis, an exhaust gas system of an internal combustion engine extending through said central tunnel in the direction of the vehicle rear, and in that the traction battery in the extension of the central tunnel has a longitudinal channel to the rear in which the exhaust gas system extends as far as the vehicle rear.

8. The two-track vehicle of claim 7, wherein the cover element is divided into two segments which are configured mirror-symmetrically relative to the vehicle central axis and which are spaced apart from one another via a longitudinal free space which is positioned in alignment with the battery longitudinal channel.

9. The two-track vehicle of claim 1, wherein, in the vehicle longitudinal direction the cover element base portion is extended to the rear by a wedge-shaped ramp to the rear in the vehicle longitudinal direction as far as a rear transverse edge in the direction of the vehicle lower face.

10. The two-track vehicle of claim 1, wherein the cover element has a frame structure on its upper face remote from the road surface.

11. A two-track vehicle comprising:
a body-floor assembly;
a component sensitive to scraping a road surface arranged on a lower face of the body-floor assembly, wherein an outer contour of the component protrudes downwardly from the lower face of the body-floor assembly in the direction of the road surface by an offset distance,
wherein the component is covered by a base portion of a cover element on a floor side of the component to protect the component from scraping the road surface,
wherein the base portion of the cover element is laterally extended in a vehicle transverse direction by at least one edge portion which forms a scraper stop,
wherein the scraper stop protrudes downwardly from the cover element base portion in the direction of the road surface by a vertical offset distance such that, when the lower face of the vehicle scrapes the road surface, the cover element base portion remains substantially out of contact with an interference contour on the road surface side,
wherein, in the vehicle longitudinal direction, the cover element base portion is extended to the front by a wedge-shaped ramp to the front in the vehicle longitudinal direction as far as a front transverse edge in the direction of the vehicle lower face.

12. The two-track vehicle of claim 11, wherein, in the vehicle longitudinal direction, the scraper stop is offset by a longitudinal offset to the rear of the front transverse edge of the ramp.

13. The two-track vehicle of claim 11, wherein, relative to a longitudinal edge of the scraper stop on the vehicle exterior, the ramp is offset by a transverse offset distance toward the vehicle interior.

* * * * *